United States Patent [19]
Akemakou et al.

[11] Patent Number: 6,147,429
[45] Date of Patent: Nov. 14, 2000

[54] ELECTRICAL MACHINE WITH DOUBLE EXCITATION, ESPECIALLY A MOTOR VEHICLE ALTERNATOR

[75] Inventors: Antoine Dokou Akemakou, Vitry sur Seine; Sing Kham Phounsombat, Paris, both of France

[73] Assignee: Valeo Equipements Electriques Moteur, Creteil, France

[21] Appl. No.: 09/262,598

[22] Filed: Mar. 4, 1999

[30] Foreign Application Priority Data

Mar. 9, 1998 [FR] France ................... 98 02886

[51] Int. Cl.$^7$ ................... H02K 1/00
[52] U.S. Cl. ................... 310/181; 310/156; 310/263; 310/261
[58] Field of Search ................... 310/181, 156, 310/263, 261

[56] References Cited

U.S. PATENT DOCUMENTS

| | | | |
|---|---|---|---|
| 5,304,882 | 4/1994 | Lipo et al. | 310/156 |
| 5,663,605 | 9/1997 | Evans et al. | 310/156 |
| 5,693,995 | 12/1997 | Syverson | 310/156 |
| 5,747,909 | 5/1998 | Syverson et al. | 310/156 |
| 5,753,989 | 5/1998 | Syverson et al. | 310/156 |
| 5,825,116 | 10/1998 | Ishikawa | 310/156 |

*Primary Examiner*—Elvin Enad
*Attorney, Agent, or Firm*—Morgan & Finnegan LLP

[57] ABSTRACT

A rotary electrical machine such as a motor vehicle alternator comprises a stator and a rotor. The stator has at least one armature winding in at least one pair of stator slots. The rotor includes means for selectively establishing closed magnetic circuits which pass around the turns of the armature winding or windings. The means for setting up closed magnetic circuits comprise at least two permanent excitation magnets which set up two magnetic fluxes having components in opposite directions according to the direction of displacement of the rotor; and, between each pair of successive magnets, at least one excitation winding having two wires and being arranged to produce in an adjustably way two flux components which are such as to oppose the fluxes set up in the magnets of the pair. The wires of the excitation windings are located in rotor slots, each of which lies between two successive rotor poles.

27 Claims, 4 Drawing Sheets

FIG_1

FIG_2

FIG_3

FIG_4

FIG_7

FIG_8

ELECTRICAL MACHINE WITH DOUBLE EXCITATION, ESPECIALLY A MOTOR VEHICLE ALTERNATOR

FIELD OF THE INVENTION

The present invention relates in general terms to rotary electrical machines such as motor vehicle alternators.

BACKGROUND OF THE INVENTION

A conventional motor vehicle alternator consists of a single-phase or multi-phase generator which generally includes a stator within which a rotor is arranged to rotate, the rotor having an excitation winding. The excitation winding is supplied with current through brushes which make contact with two slip rings arranged on a projecting portion of the rotor shaft.

It is already known, in particular from European patent specification No. EP 0 707 374A, to provide such rotary machines in which, with a view in particular to increasing their power output, the field of excitation of the rotor is produced simultaneously by permanent magnets and by excitation windings. This is generally referred to as mixed excitation. In such a machine, the current delivered by the armature of the machine (using switching means associated with the excitation windings) is controlled. Such switching means are arranged to enable the direction of excitation to be reversed selectively, thus reducing the magnetic flux of the permanent magnets, or even canceling it out.

This necessity for reversing the direction of the excitation current makes it necessary to employ a semiconductor switching bridge of the H type, which is relatively expensive and which therefore raises the selling price of the machine.

DISCUSSION OF THE INVENTION

An object of the present invention is to overcome the above mentioned drawbacks and to propose a machine, in particular a rotary electrical machine such as an alternator, which has mixed excitation and in which the regulation, or adjustment, of the current delivered can be obtained by working on an excitation which is produced by windings in a unidirectional manner, and in particular by causing the excitation produced by the windings to vary between an essentially zero value and a maximum value, so as to deliver respectively a limited, or even essentially zero, amount of energy, and a maximum amount of energy.

A further object of the invention in such a machine is to ensure good recovery of the flux produced by the permanent magnets when the machine is in an excited state, in particular by minimizing the losses of flux which occur for example as a result of a circumferential flux within the rotor.

According to the invention in a first aspect, an electrical machine comprising a stator and a rotor, the stator comprising at least one armature winding received in at least one pair of stator slots, the rotor including means adapted for the selective establishment of closed magnetic circuits passing around loops of the armature winding or windings, is charactized in that the said means include at least two permanent excitation magnets which are adapted to set up two magnetic fluxes having opposed components of direction according to the direction of displacement of the rotor, and, between each said magnet and the next successive magnet (which together constitute a pair of magnets), at least one excitation winding having two wires and adapted to generate two adjustable components of flux adapted to oppose the fluxes generated in the magnets of the said pair, the wires of the said windings being received in rotor slots, each of which is located between two successive poles of the rotor.

According to a preferred feature of the invention, each said magnet is disposed in a slot, which is referred to herein as a magnet slot and which is oriented in a generally radial direction, the said magnets being adapted to establish a generally circumferential magnetic flux, and the said rotor slots constitute a set of slots such that each rotor pole is delimited by and between a pair of said rotor slots, the rotor slots enclosing, in succession, a said magnet, at least one excitation winding, and so on. In preferred embodiments of such a case, means are arranged in the rotor for limiting the circulation of a reverse flux between each magnet and the axis of the rotor.

According to another preferred feature of the invention, each magnet is disposed in a seating situated in radial alignment with a magnet pole of the rotor, and are arranged to generate a generally radial magnetic flux, and the rotor includes, in circumferential succession, empty first slots, pairs of which flank a magnet pole, then an odd number of winding poles, and so on, with adjacent winding poles delimiting, in pairs, respective winding slots containing the excitation winding or windings.

In this last mentioned case, in preferred embodiments of the machine, the air gaps between the successive poles of the rotor on the one hand, and the stator on the other, are alternatively of a first dimension and a second dimension different from the said first dimension, the magnet poles having the smaller air gap.

According to a further preferred feature of the invention, a single excitation winding having two wires is arranged between two successive magnets.

In some embodiments of the invention, the rotor has a number of poles which is equal to a whole number multiple of six. In other embodiments, the rotor has a number of poles which is equal to a whole number multiple of four.

According to yet another preferred feature of the invention, at least two windings are arranged between two successive magnets, each said winding having two wires wound in the same direction.

According to the invention in a second aspect, an electrical machine comprising a stator and a rotor, the stator comprising at least one armature winding received in at least one pair of stator slots which define between them a plurality of stator poles, with the rotor having a plurality of rotor poles in relation with the poles of the stator and means adapted for selectively establishing closed magnetic circuits which pass, via the stator and rotor poles around the wires of the armature winding or windings, is characterized in that the said means comprise permanent excitation magnets and excitation windings, the permanent magnets and the excitation windings being so arranged that, when no current is passing through the excitation windings, the rotor poles have a configuration which consists of alternate successions of groups of identical north and south poles in the same odd number greater than one, and in that, when a current is passing through the excitation windings, the poles of the rotor have a configuration consisting of individual alternate north and south poles.

According to the invention in a third aspect, an electrical machine comprising a stator and a rotor, the stator comprising at least one armature winding received in at least one pair of rotor slots which define between them a plurality of stator poles, with the rotor having a plurality of rotor poles in relation with the poles of the stator and means adapted for selectively establishing closed magnetic circuits which pass, via the stator and rotor poles around the wires of the armature winding or windings, characterized in that the said means comprise permanent excitation magnets and excitation windings, the permanent magnets and the excitation windings being so arranged that, when no current is passing through the excitation windings, the poles of the rotor have a configuration which consists alternatively of a given individual pole and a succession, in an odd number greater than one, of inverse poles, and in that, when a current is passing through the excitation windings, the poles of the rotor have a configuration consisting of individual alternate north and south poles.

The rotary electrical machine according to the invention, incorporating any or all of the above features, is typically, though not necessarily, an alternator for a motor vehicle.

Further features and advantages of the invention will appear more clearly on a reading of the following detailed description of some preferred embodiments of the invention, which is given by way of non-limiting example only and with reference to the accompanying drawings.

DESCRIPTION OF PREFERRED
EMBODIMENTS OF THE INVENTION

First it should be noted that, as between one Figure and another in the drawings, those elements or parts which are identical or similar to each other are designated as far as possible by the same reference signs.

Figure 1:
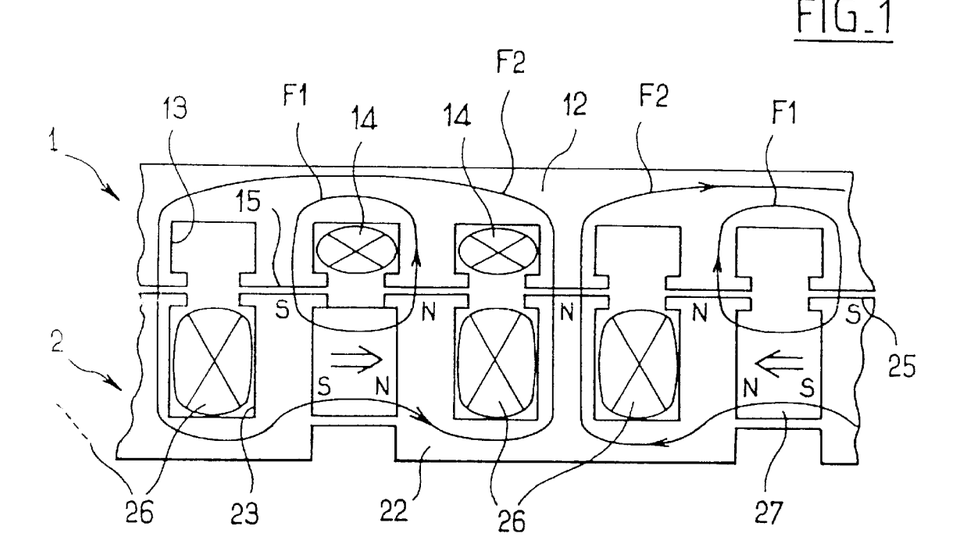
FIG. 1 is a diagrammatic view, developed in one plane, showing the rotor and stator assembly of a rotary electrical machine in a first basic embodiment of the invention, with FIG. 1 showing the machine with its windings in a state of non-excitation.
Figure 2:
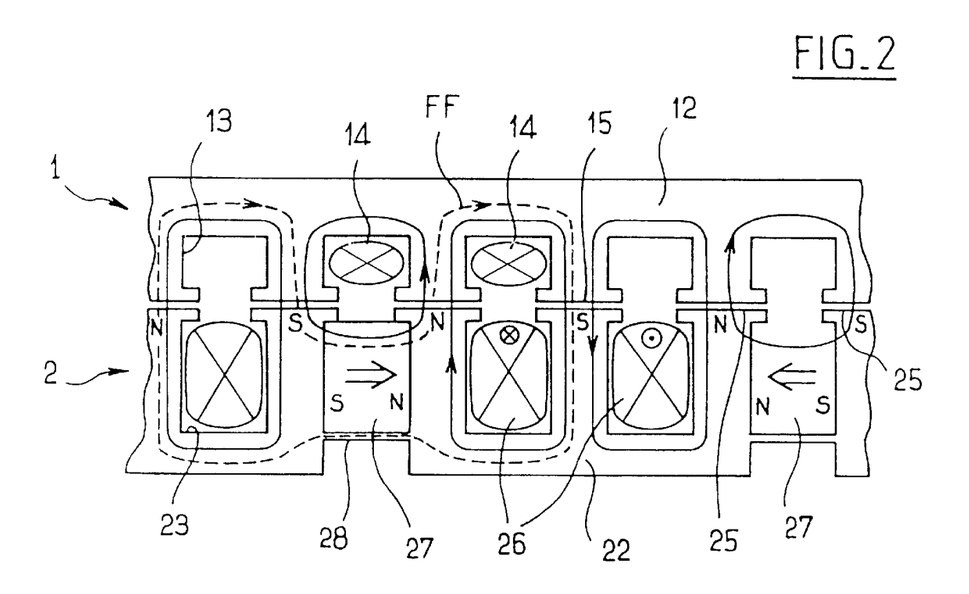
FIG. 2 is a view similar to FIG. 1, but showing the machine with the windings in a state of excitation.

Reference is first made to FIGS. 1 and 2, which show diagrammatically part of a stator 1 and the corresponding part of a rotor 2 for a single-phase or multi-phase electrical machine in accordance with the present invention. This description will be directed, for the sake of convenience, to the case where the machine is an alternator.

The stator 1 has a carcase 12 which defines a continuous annular structure, at the inner periphery of which a set of stator slots 13 is formed. Entirely in the conventional way, these slots 13 contain the wires of the armature windings 14.

There is an even number of the stator slots 13, and they are spaced apart circumferentially at regular intervals, leaving between them projecting poles 15.

As to the rotor 2, this has a carcase 22 which is generally cylindrical, and in which a plurality of rotor slots 23 are formed. The slots 23 define between them projecting rotor poles 25, the angular pitch of which is in this example identical with that of the poles 15 of the stator, this being true for a single-phase machine. The rotor slots 23 receive, as the case may be, either a permanent magnet 27 or the wires 26 of an excitation winding. In the case of the permanent magnet 27, the lines of flux of the latter are oriented essentially tangentially, that is to say along the rotor structure in the developed form shown in FIGS. 1 and 2.

Accordingly, adjacent slots of the rotor contain, in succession in this order, the following:

a magnet 27 having a first polarity;

two wires of an excitation winding 26, received in two adjacent slots;

another magnet 27 having a second polarity which is opposite to the first polarity mentioned above;

again, two excitation winding wires, which are arranged so that the currents that pass through them are inverse to those flowing in the previously mentioned wires of this winding; and yet another permanent magnet 27, having the first polarity; and so on.

The wires of the excitation winding 26 are energized in common by the same excitation current, and are connected either in series or in parallel. This excitation current is such as to vary in a unidirectional manner between a zero value and a maximum value. This is achieved by means of regulation and control means which are not shown but which are conventional in themselves.

It will be noted here in this connection that no two-directional excitation current is required, so that the electronic switching means which are provided for the purposes of varying this current require only a single power interrupter. This is by contrast with the H bridges with four power interrupters which are necessary for setting up a two-directional current.

The behavior of the stator-rotor assembly in the absence of any excitation current in the windings 26 is illustrated in FIG. 1. It will be seen that the permanent magnets 27 create, in the region of the two adjacent poles 25, SN magnetizations for those having the first polarity, and NS for those having the second polarity. In addition, each rotor pole 25 situated between the rotor slots 23 receiving the loops 26 of the same winding possess a polarity which is identical with that of its two neighbors, with the primary lines of flux and secondary lines of flux indicated by the arrows F1 and the arrows F2 in FIG. 1, respectively.

The rotor accordingly adopts on its successive poles the following polarity pattern:

-S-N-N-N-S-S-S-N-N-N-S-S-S-N-

This being so, the pattern of the alternate north and south polarities adopts a pitch which is equal to three times the pitch of the stator poles 15, so that the magnetic energy which is transferred to the stator 1 has a minimum value. This minimum value, which varies in particular as a function of the power of the permanent magnets and the geometry of the rotor, can be reduced to a value which is weak enough to make it suitable, in particular, for the minimum excitation state of a motor vehicle alternator.

FIG. 2 shows the case where a current is flowing through the excitation windings 26. The direction of the current is such that the flux generated by each of these windings is opposed to the fluxes generated together by the two permanent magnets arranged on either side of that winding, and which in the absence of excitation contribute to the establishment, at the level of the pole flanked by the two excitation winding wires, a polarity which is equal to that of its two immediate neighbors.

On the other hand, the excitation of the winding will reverse the polarity of the above mentioned pole, and the lines of flux follow the paths shown in FIG. 2. The polarity pattern in the rotor then becomes N-S-N-S-N-S- . . . , and a larger amount of magnetic energy, which increases with the intensity of the excitation current, is transferred to the stator. The machine will then be able to supply, in the case of an alternator, an increase in the current demand.

The transferred magnetic energy is at a maximum when the fluxes available on the alternate poles of the rotor are substantially identical to each other, and the maximum excitation current is preferably determined according to this criterion. It will be noted here that, in order to minimize leakage of magnetic flux, created by a winding 26, towards an adjacent winding by passing from the other end of the magnet situated between these two windings (and FIG. 2 shows in broken lines at FF such a leakage flux), the rotor carcase 22 is so designed as to minimize the magnitude of these leaks. It will accordingly be seen in FIGS. 1 and 2 that the thickness of the carcase outside each permanent magnet 27 is very much reduced as indicated at 28, so as to minimize these leaks. In this connection, it is preferable to use a rotor shaft of a non-magnetic material, so as to avoid the occurrence of leaks as indicated by the arrows FF, upsetting the equilibrium of the poles.

It will also be noted that, given the excellent coupling between each permanent magnet and the associated poles in the excitation state shown in FIG. 2, ferrite magnets can be adequate, although magnets of higher output, based on the rare earth metals, can of course also be used.

Figures 3, 4:
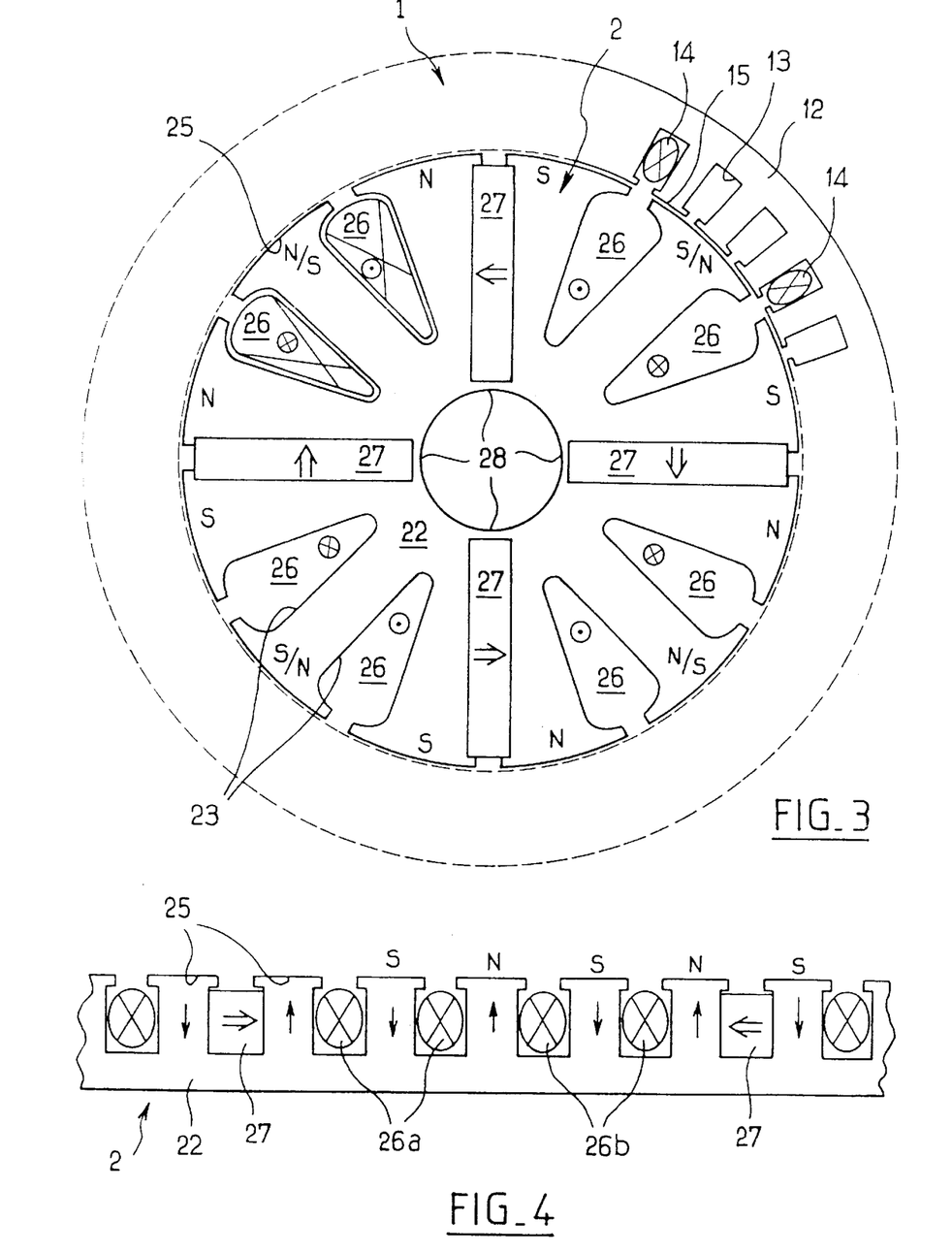
FIG. 3 is a diagrammatic view in transverse cross section of one example of a machine according to the invention in a particular practical embodiment.
FIG. 4 shows diagrammatically, again in developed form, the rotor part of a machine in the basic first embodiment of the invention shown in FIG. 1, but FIG. 4 shows another version of the rotor part of the machine.

Reference is now made to FIG. 3, showing diagrammatically one particular practical embodiment of a rotary machine in accordance with the invention, which in this example is a three-phase machine having twelve poles in the rotor and thirty-six stator poles.

The twelve rotor poles are defined between twelve rotor slots 23 which are preferably spaced apart at substantially regular intervals. Four of these rotor slots, referred to here as magnet slots and being, in this example, spaced apart by 90° from each other, receive respectively four permanent magnets 27, the north-south directions of which are alternatively oriented in the clockwise direction and the counter-clockwise direction. These four magnets are separated by four excitation windings 26, the wires of which occupy the remaining pairs of rotor slots, with the directions of connection of the two windings in each pair being opposed as shown, so as to create opposed poles when they are excited.

In FIG. 3 the designations N/S and S/N indicate respectively the polarity in the absence of excitation and the polarity in the presence of excitation. It will of course be understood that this implies that the excitation is sufficiently high to overcome the secondary flux, indicated by the arrow F2 in FIG. 1, set up by the magnets.

It will also be observed in FIG. 3 that the permanent magnets 27 are received in slots which extend radially inwards nearly as far as the non-magnetic central part of the rotor, which is typically a shaft seating.

A person skilled in this art will of course be able to develop, from the above disclosure, the necessary adaptations in order to obtain the required number of poles, given that this must be a multiple of six in the foregoing embodiments.

Reference is now made to FIG. 4, showing another version in which two permanent magnets 27 of opposed alternate polarities are separated, not here by two slots receiving two loops of an excitation winding, but by four slots which receive, respectively, four wires which constitute two excitation windings 26a and 26b respectively. Both of these windings are wound in the same direction, given that, on the other side of each permanent magnet, the two windings will be wound in the opposite direction.

In the absence of excitation, the behavior of the arrangement shown in FIG. 4 is similar to that in FIG. 1, that is to say the magnetic fluxes established by two successive, opposed, permanent magnets will be distributed over the various poles which are flanked by those magnets, all of which will then assume the same polarity. In that case, the following pattern is obtained:

. . . -S-N-N-N-N-N-S-S-S-S-S-N-N . . . , the pitch of which is therefore equal to five times that of the poles of the stator in the case of a single-phase machine. The magnetic energy transmitted to the stator is therefore a minimum.

When the windings are excited, the fluxes set up are indicated diagrammatically by rising and descending arrows in FIG. 4. The polarity pattern then consists of alternating polarities N-S-N-S-N . . . , and an increased amount of energy is transmitted to the stator. In this example, the number of poles in the rotor will be a multiple of ten.

Figure 5:
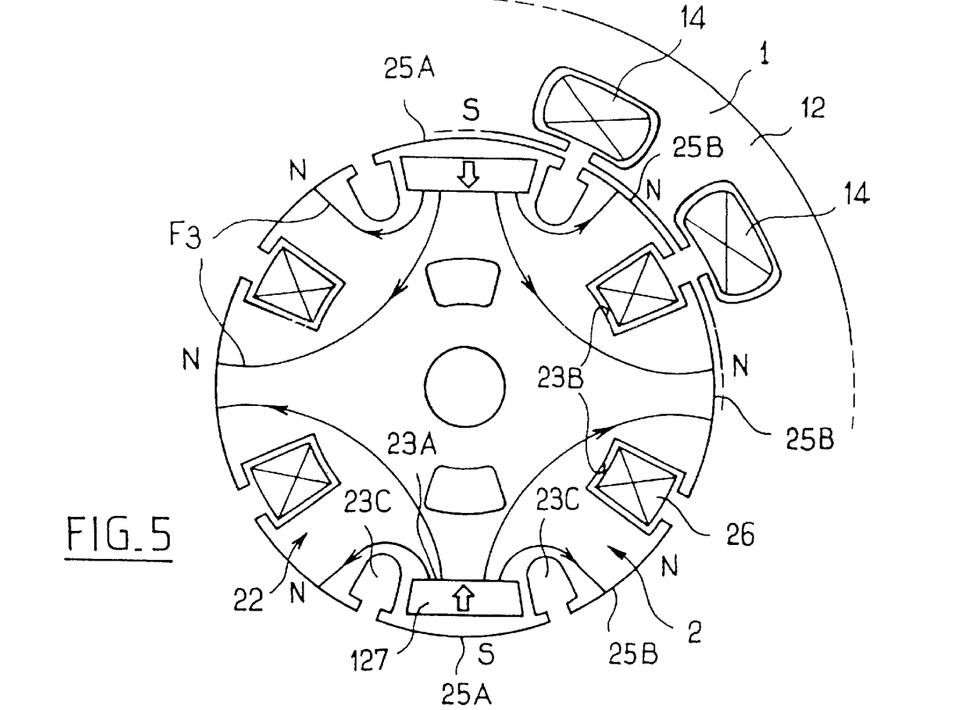
FIG. 5 shows diagrammatically in transverse cross section a rotor and stator assembly in a second basic embodiment of the invention, in a state of non-excitation.

Reference is now made to FIG. 5, which shows a rotor and stator assembly in a second basic embodiment of the invention. This second basic embodiment is distinguished from the first basic embodiment described above with reference to FIGS. 1 to 4, mainly in that each of the permanent magnets, which are here designated by the reference 127, no longer occupy a slot and two adjacent poles of the rotor 2. Instead, each magnet 127 is mounted on the surface in the region of a single pole of the rotor.

Thus, a plurality of permanent magnets 127 are spaced apart at regular intervals around the periphery of the rotor, and can be provided in either an even number or an odd number, by contrast with the embodiments represented by FIGS. 1 to 4.

The structure of the rotor 2 comprises in this case a carcase which defines, in radial alignment with a magnet pole 25A, a shallow seating 23A for a permanent magnet 127 which sets up essentially radial lines of flux which are directed from the outside of the rotor towards the inside. The magnet pole 25A is bounded by a shallow slot 23C which is left empty. This is followed by what we shall call a winding pole 25B, then a slot 23B for a first wire 26 of the winding 26, and then another winding pole 25B. This is followed by a further notch 23B for the second wire 26 of the same winding, which in turn is followed by a third winding pole 25B. After this, finally, comes yet another slot 23C, which is itself followed by a new magnet pole 25A associated with a seating 23A, which receives another magnet 127. This configuration is repeated any convenient number of times (in this example it is repeated once), around the periphery of the rotor 2.

In the absence of excitation, the behavior of this machine is shown in FIG. 5, and has similarities with the behavior of the machine in FIG. 1, to the extent that the north pole situated on the inner face of each permanent magnet 27 sets up lines of flux F3 which are propagated to the various poles 25B of the rotor, so that these latter also become north poles, while the magnet pole 25A is a south pole. In this case, the pole configuration is therefore:

. . . -S-N-N-N-S-N-N-N.

It will be understood that in this situation, only a minimum amount of magnetic energy is passed to the stator.

Figure 6:
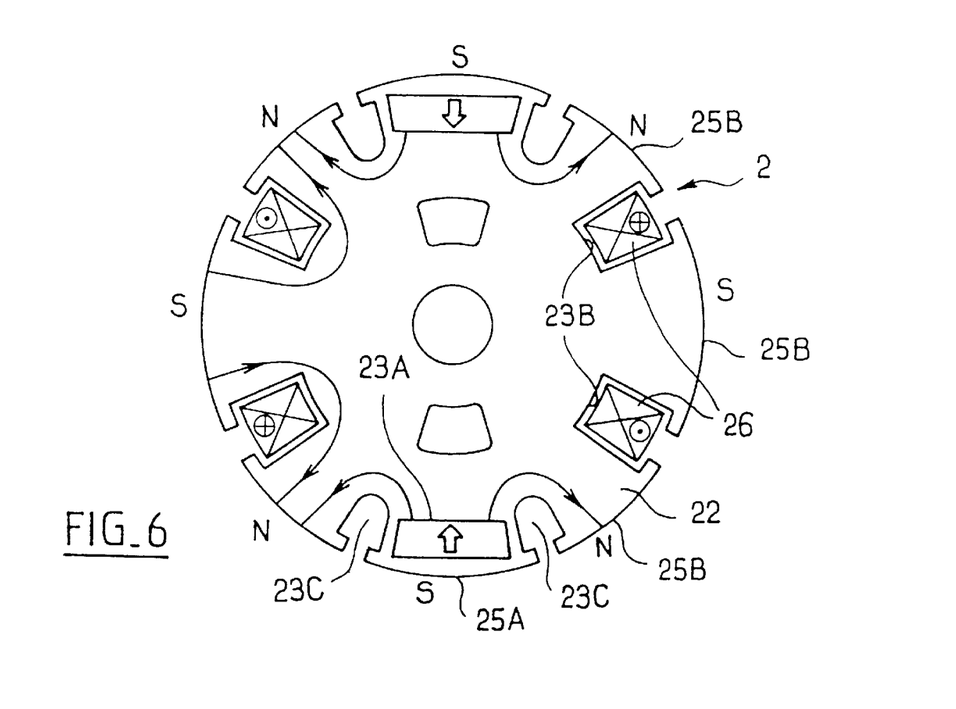
FIG. 6 shows the same rotor and stator assembly as FIG. 5, but in a state of excitation.

When the windings 26 are excited, each one then generates a flux which opposes propagation of the lines of flux F3 from the magnets 127 to the poles 25b which are situated between the two wires of one winding, while the flux established by the windings, on the other hand, reinforces the flux which will be directed from each magnet 127 towards each of the poles 25b that flank the magnet pole, as can be seen in FIG. 6.

In this case, it will be understood that the poles of the stator will adopt the configuration . . . -N-S-N-S-N . . . , which ensures that energy that increases progressively with the excitation current in the windings 26 will be transferred to the stator.

Figures 7, 8:
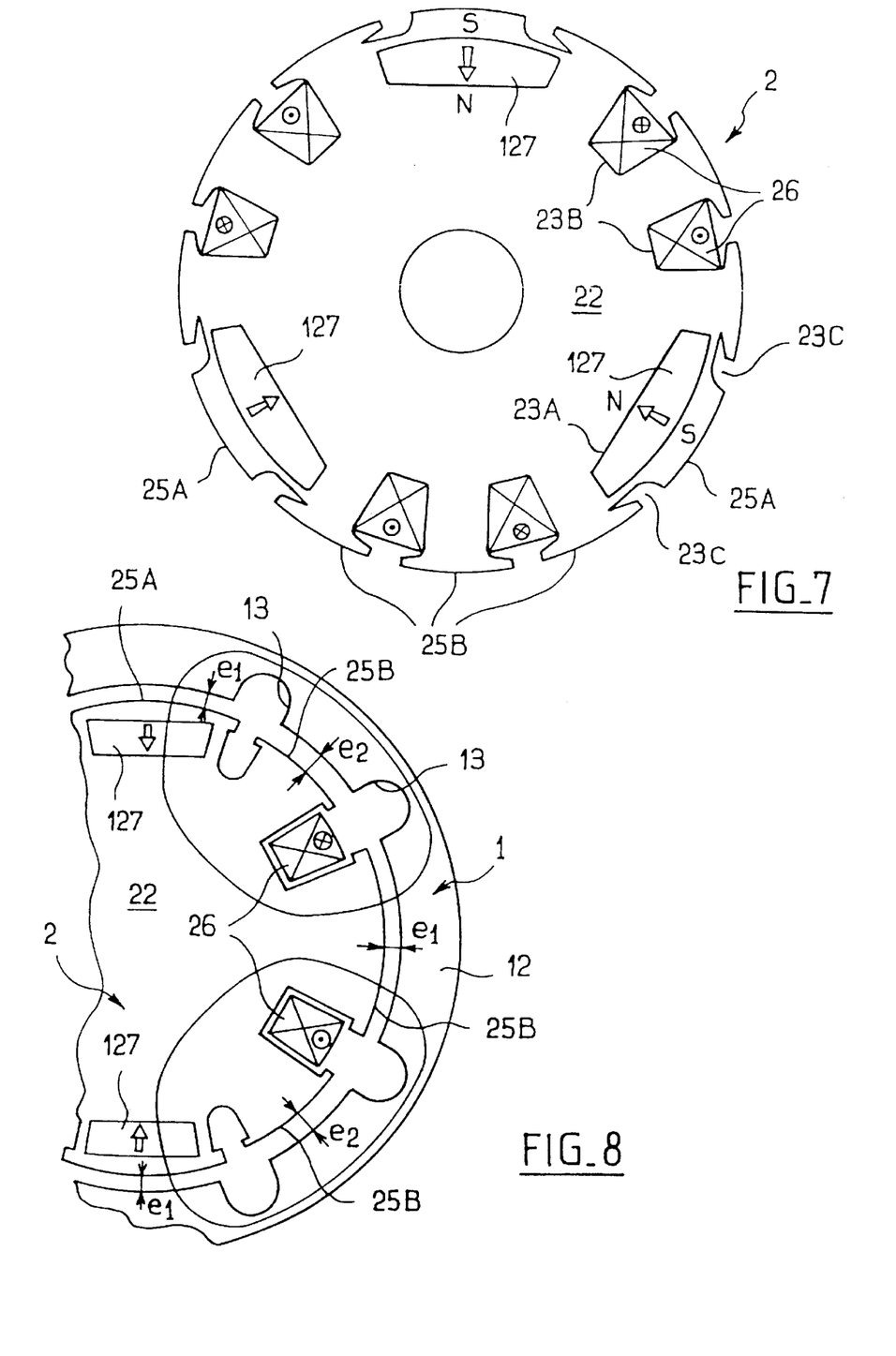
FIG. 7 shows diagrammatically in transverse cross section a rotor and stator assembly in a further version, which is a variant on the version shown in FIGS. 5 and 6.
FIG. 8 shows an improvement in an electrical machine in the second basic embodiment of the present invention.

Although FIGS. 5 and 6 illustrate a single-phase machine with eight poles in the rotor and eight poles in the stator, FIG. 7 (to which reference is now made) shows another version in which the machine is a three-phase machine having twelve rotor poles and thirty-six stator poles.

The manufacture of a rotor with twelve poles involves in this case the use of three permanent magnets 127 which are spaced apart by 120° from each other, together with three windings which are situated between the respective pairs of magnets 127. It will also be noticed in FIG. 7 that there is a particular configuration of the empty slots 23C, which are generally in the shape of a comma pointing away from the associated magnet pole 25A.

It will be noted here that, in order to multiply the number of poles without increasing the number of permanent magnets, it will be possible to provide two windings, each with two loops, between two successive magnets in a similar way to that seen in FIG. 4. It will also be understood that, by contrast with the versions described above with reference to FIGS. 1 to 4, the number of magnets may if required be odd, and this in some cases can facilitate design and quantity manufacture.

In addition, and with reference now to FIG. 8, which shows part of a rotor and stator assembly in yet another version of the second basic embodiment of the invention, this version enables the magnetic energy transmitted to the stator in the absence of excitation to be reduced even more. In FIG. 8 it will be noted that each pole 25B which is immediately adjacent to a magnet pole 25A has, between it and the stator, a radial air gap e2, which is substantially greater than the air gap e1 that exists, firstly between the magnet pole 25A and the stator, and secondly between the other pole 25B and the stator.

As a result, in the state of non-excitation, there is substantially preferential flow of the lines of flux from the inner face of each permanent magnet towards the poles 25B that lie offset by two steps with respect to the magnet pole. In the polar configuration of the rotor, this gives a preferential configuration of the type . . . -N- . . . -S- . . . -N- . . . , in which the flux transmitted to the stator is theoretically zero.

The air gaps e2 are of course small enough for the coupling between the poles 25B adjacent to the magnet poles 25A and the stator to be suitable in the excitation state.

The present invention is in no way limited to the embodiments described and shown in the drawings, but the person skilled in the art will be able to apply to them any variation or modification that falls within the spirit of the invention.

What is claimed is:

1. An electrical machine, comprising:

a stator defining at least one pair of stator slots;

at least one armature winding having at least one wire in the stator slots;

a rotor within the stator defining a plurality of rotor poles in circumferential succession and a plurality of rotor slots, each of which lies between two successive poles;

a current adjustment circuit that provides unidirectional adjustable current;

at least two permanent excitation magnets on the rotor for establishing two magnetic fluxes having components in opposite directions in accordance with the direction of displacement of the rotor in the stator, the magnets defining at least one pair of successive magnets; and at least one excitation winding having two wires received in the rotor slots between the magnets of each pair, the excitation winding coupled to said current adjustment circuit to adjustably produce two components of flux such as to oppose the fluxes produced in the magnets of the pair, the excitation magnets and the excitation windings selectively establishing closed magnetic circuits passing around the armature winding.

2. An electrical machine according to claim 1, wherein:

the rotor slots include magnet slots oriented in a generally radial direction;

each magnet is disposed in a magnet slot and is adapted to produce a generally circumferential magnetic flux;

the rotor slots define pairs of slots such that both slots of a pair flank a rotor pole between them; and the rotor slots comprise a set which in circumferential succession alternate between a magnet slot and a slot containing an excitation winding.

3. An electrical machine according to claim 2, wherein:

the rotor further includes means for limiting the flow of a reverse flux between each magnet and an axis of rotation of the rotor.

4. An electrical machine according to claim 1, wherein:

the rotor poles comprise magnet poles and winding poles;

the rotor slots comprise magnet slots, empty first slots, and winding slots;

each magnet slot is situated substantially in radial alignment with a magnet pole, each magnet being disposed in a respective magnet slot for producing a generally radial magnetic flux;

the first slots define pairs of first slots flanking a magnet pole on either side;

the winding poles are arranged in pairs of adjacent poles with the winding poles of each pair bounding a respective winding slot between them; and the poles are arranged in a circumferential succession alternating between a magnet pole and an odd number of winding poles.

5. An electrical machine according to claim 4, defining an air gap between each rotor pole and the stator such that the air gap between a winding pole and the stator has a first dimension, and the air gap between a magnet pole and the stator has a second dimension smaller than the first dimension.

6. An electrical machine according to claim 1, wherein:

a single excitation winding with two wires is between two successive magnets of the rotor.

7. An electrical machine according to claim 6, wherein:

the rotor slots include magnets slots oriented in a generally radial direction;

each magnet is disposed in a magnet slot and is adapted to produce a generally circumferential magnetic flux;

the rotor slots define pairs of slots such that both slots of a pair flank a rotor pole between them;

the rotor slots comprise a set which in circumferential succession alternate between a magnet slot and a slot containing an excitation winding; and the rotor has a number of poles equal to a whole number multiple of six.

8. An electrical machine according to claim 6, wherein:

the rotor poles comprise magnet poles and winding poles;

the rotor slots comprise magnet slots, empty first slots, and winding slots;

each magnet slot is situated substantially in radial alignment with a magnet pole, each magnet being disposed in a respective magnet slot for producing a generally radial magnetic flux;

the first slots define pairs of first slots flanking a magnet pole on either side;

the winding poles are arranged in pairs of adjacent poles with the winding poles of each pair bounding a respective winding slot between them;

the poles are arranged in a circumferential succession alternating between a magnet pole and an odd number of winding poles; and the rotor has a number of poles equal to a whole number multiple of four.

9. An electrical machine according to claim 1, wherein:

the rotor has, between successive magnets, at least two excitation windings having two wires, both wound in the same direction.

10. An electrical machine according to claim 1, being a motor vehicle alternator.

11. An electrical machine, comprising:

a stator defining at least one pair of stator slots, the stator slots defining between them a plurality of stator poles;

a wire armature winding mounted in the stator slots;

a rotor within the stator defining a plurality of rotor poles associated with the stator poles;

a current adjustment circuit that provides unidirectional adjustable current; and permanent excitation magnets and excitation windings, said excitation windings coupled to said current adjustment circuit for selectively establishing closed magnetic circuits passing around the wires of the armature winding via the stator and rotor poles, the rotor poles defining a configuration consisting of alternate successive groups comprising a common odd number greater than one of identical north and south poles, and wherein, when current flows in the excitation windings, the rotor poles define a configuration comprising individual alternate north and south poles.

12. An electrical machine, comprising:

a stator defining at least one pair of stator slots, the stator slots defining between them a plurality of stator poles;

a wire armature winding mounted in the stator slots;

a rotor within the stator defining a plurality of rotor poles associated with the stator poles;

a current adjustment circuit that provides unidirectional adjustable current; and permanent excitation magnets and excitation windings, said excitation windings coupled to said current adjustment circuit for selectively establishing closed magnetic circuits passing around the wire of the armature winding via the stator and rotor poles, the rotor poles defining a configuration consisting alternatively of a given individual pole and a succession of opposite poles in an odd number greater than one, and wherein, when current flows in the excitation windings, the rotor poles define a configuration comprising individual alternate north and south poles.

13. A rotor, comprising:

a plurality of circumferentially adjacent magnets;

a plurality of poles between adjacent magnets extending outwardly in a radial direction, the spaces between the poles forming a plurality of slots;

a current adjustment circuit that provides unidirectional adjustable current; and an excitation winding coupled to said current adjustment circuit in the slots adjacent to at least one of the plurality of poles between adjacent magnets, whereas when substantially none of said current flows through the excitation winding, a magnetic field generated by adjacent magnets induces the same polarity on poles between the adjacent magnets, and when more than a threshold level of said current flows through the excitation winding, a combined magnetic field generated by the adjacent magnets and the excitation winding between the adjacent magnets induces opposite polarities on adjacent poles between the adjacent magnets.

14. A rotor according to claim 13, wherein:

the magnets are aligned so that the magnetic flux within the magnets is substantially parallel with the outer edge of the rotor.

15. A rotor according to claim 14, wherein:

adjacent magnets have opposite polarities.

16. A rotor according to claim 15, further comprising:

a plurality of excitation windings having the same polarity between adjacent magnets.

17. A rotor according to claim 13, wherein:

the magnets are aligned such that the magnetic flux within the magnets is substantially perpendicular with the outer edge of the rotor.

18. A rotor according to claim 17, wherein:

adjacent magnets are aligned having the same magnetic pole extending towards the outer edge of the rotor.

19. A rotor according to claim 13 further comprising an alternator stator.

20. An electrical machine, comprising:

a stator;

a rotor containing a plurality of circumferentially adjacent magnets, the adjacent magnets separated by a plurality of poles; and means for selectively adjusting a unidirectional excitation current to induce either the same polarity on adjacent poles separating the adjacent magnets or opposite polarities on adjacent poles separating the adjacent magnets.

21. An electrical machine according to claim 20, wherein:

gaps between the stator and the rotor poles immediately adjacent to the magnets are larger than gaps between the stator and other rotor poles.

22. An electrical machine according to claim 20, further comprising:

an armature winding in slots adjacent to at least one of a plurality of poles on the stator.

23. An electrical machine according to claim 22, wherein:

the stator has three times as many poles as the rotor.

24. An electrical machine according to claim 20, wherein:

the rotor contains a shaft of non-magnetic material.

25. An electrical machine according to claim 24, wherein:

the magnets extend radially inward substantially to the shaft.

26. A method for generating power, comprising:

generating a magnetic field with a plurality of permanent magnets embedded in a rotor of an electrical machine, the magnetic field inducing the same polarity on adjacent poles between successive magnets; and selectively adjusting a unidirectional excitation current coupled to excitation windings embedded in the rotor above a threshold level so that the magnetic field generated by the excitation current in the excitation windings combines with the magnetic field generated by the magnets to induce opposite polarities on adjacent poles between adjacent magnets.

27. A method according to claim 26, further comprising:

varying the strength of the magnetic field by providing varying levels of the excitation current from substantially zero to a maximum value.

* * * * *